(12) United States Patent
Courtright et al.

(10) Patent No.: US 8,360,096 B2
(45) Date of Patent: Jan. 29, 2013

(54) LOW PRESSURE RISE RATE PILOT OPERATED POPPET RELIEF VALVE

(75) Inventors: Dennis O. Courtright, Easley, SC (US); Enzo Soncini, Reggio Nell'emilia (IT); Davide I. Davoli, Reggio Nell'emilia (IT)

(73) Assignee: Sauer-Danfoss Inc., Ames, IA (US)

( * ) Notice: Subject to any disclaimer, the term of this patent is extended or adjusted under 35 U.S.C. 154(b) by 1101 days.

(21) Appl. No.: 11/839,012

(22) Filed: Aug. 15, 2007

(65) Prior Publication Data

US 2009/0044871 A1 Feb. 19, 2009

(51) Int. Cl.
*F16K 31/122* (2006.01)

(52) U.S. Cl. ............................ 137/492; 137/488

(58) Field of Classification Search .................. 137/485, 137/488, 489, 489.3, 491, 492
See application file for complete search history.

(56) References Cited

U.S. PATENT DOCUMENTS

| | | | | |
|---|---|---|---|---|
| 3,608,576 A | * | 9/1971 | Wilhelm | 137/242 |
| 3,726,301 A | * | 4/1973 | Schmidt | 137/102 |
| 4,289,160 A | * | 9/1981 | Kawasaki et al. | 137/491 |
| 4,351,356 A | * | 9/1982 | Koiwai et al. | 137/491 |
| 4,580,594 A | * | 4/1986 | Petts | 137/491 |
| 4,597,410 A | * | 7/1986 | Wilke | 137/491 |
| 4,738,282 A | | 4/1988 | Boehringer | |
| 4,860,788 A | * | 8/1989 | Asaoka | 137/491 |
| 5,195,556 A | * | 3/1993 | Fassbender | 137/491 |
| 5,595,209 A | * | 1/1997 | Atkinson et al. | 137/116.5 |
| 6,119,722 A | * | 9/2000 | Zaehe | 137/494 |
| 6,390,570 B1 | | 5/2002 | Saenz et al. | |
| 6,640,830 B2 | | 11/2003 | Zahe | |
| 6,745,792 B2 | * | 6/2004 | Koo | 137/491 |
| 6,805,155 B2 | | 10/2004 | Slawinski et al. | |
| 7,069,945 B2 | | 7/2006 | Slawinski et al. | |
| 7,159,610 B2 | | 1/2007 | Cheong | |
| 2006/0266419 A1 | | 11/2006 | Krug-Kussius | |

FOREIGN PATENT DOCUMENTS

JP 57037164 3/1982

* cited by examiner

*Primary Examiner* — William McCalister
(74) *Attorney, Agent, or Firm* — Zarley Law Firm, P.L.C.

(57) ABSTRACT

A relief valve for a hydraulic machine that combines a poppet valve assembly and a pilot valve assembly together using a connector pin wherein internal fluid passageways within the poppet and pilot spools provide a fluid flow path between the inlet of the valve and a cavity disposed between the poppet and pilot. As a result of the internal passageways fluid is metered to the interior cavity to provide additional control and stability within the relief valve.

13 Claims, 3 Drawing Sheets

LOW PRESSURE RISE RATE PILOT OPERATED POPPET RELIEF VALVE

BACKGROUND OF THE INVENTION

This invention relates to hydraulic devices. More specifically this invention relates to a relief valve for a hydraulic device.

Traditionally, low leakage relief valves utilize a direct acting poppet and low pressure rise rate valves are pilot operated. Direct acting poppet valves have a tendency to be unstable unless a very high rate spring or special geometry is used. The use of a high rate spring increases the pressure rise rate proportionately. Thus, there is a need to combine a poppet with a pilot to have functioning of both within a valve at a low cost. Attempts have been made to met this need; however, typically a traditional style pilot operation combined with a poppet is unstable. Additional problems exist with complex machining needed to accomplish the combination thus adding to manufacturing costs.

Therefore, a principal object of the present invention is to provide a poppet relief valve that improves control of the valve.

Another object of the present invention is to minimize manufacturing costs associated with a poppet relief valve.

Yet another object of the present invention is to provide a poppet relief valve that minimizes instability therein.

These and other objects, features or advantages of the present invention will become apparent from the specification and claims.

BRIEF SUMMARY OF THE INVENTION

A poppet relief valve for a hydraulic device. The relief valve contains a poppet and a pilot that matingly and detachably connect with one another. The poppet moves relative to the pilot and the pilot has a seat for receiving a pilot ball that is biased against the pilot. A poppet spool is disposed through a cavity of the poppet and has at least one internal passageway disposed therein. Similarly a pilot spool is disposed through a cavity in the pilot and has at least one internal passageway disposed therein. The poppet and pilot spools are connected and through the use of the internal passageways of each to provide fluid communication from a first area within an inlet of a poppet housing to a second area between the poppet and pilot. Said fluid communication functions to meter fluid flow from the first area to the second area.

DETAILED DESCRIPTION OF THE PREFERRED EMBODIMENT

Figure 1:
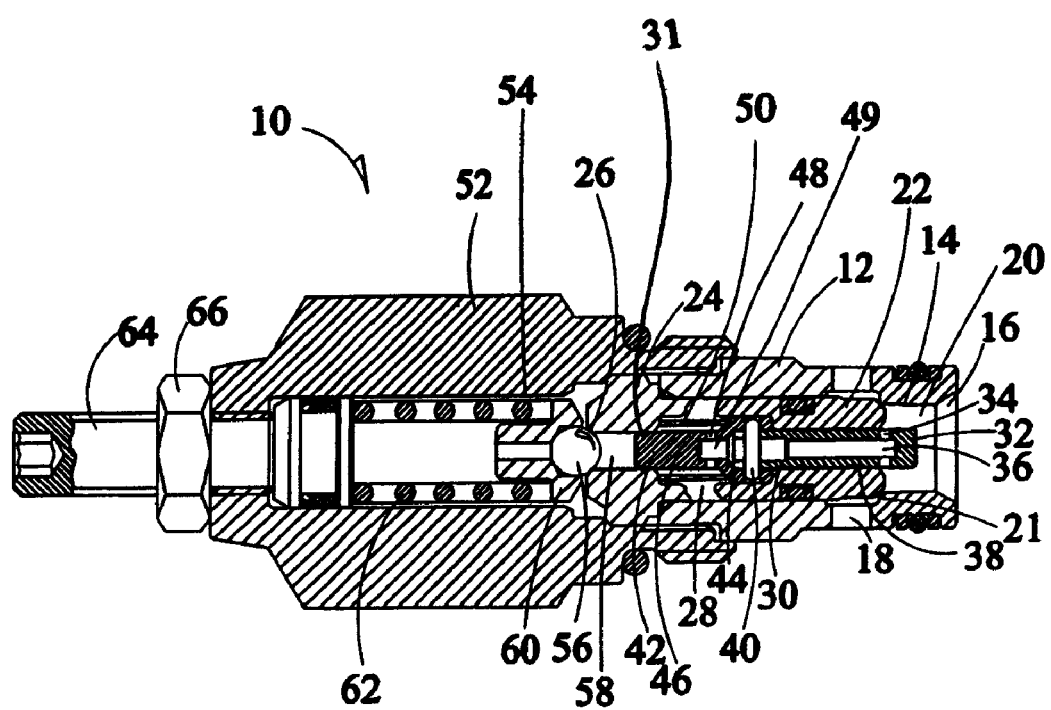
FIG. 1 is a sectional view of a poppet relief valve in a first position.

The figures show a relief valve 10. The relief valve 10 comprises a poppet housing 12 with a centrally located cavity 14 in fluid communication with a valve inlet 16 at a first end and a fluid outlet 18 adjacent the cavity 14 to provide fluid flow communication with a tank (not shown). Adjacent the inlet 16 within the cavity 14 is a first area 20 wherein the inlet 16 provides pressure. The poppet housing additionally has a poppet seat 21 therein for receiving a poppet 22.

Figure 2:
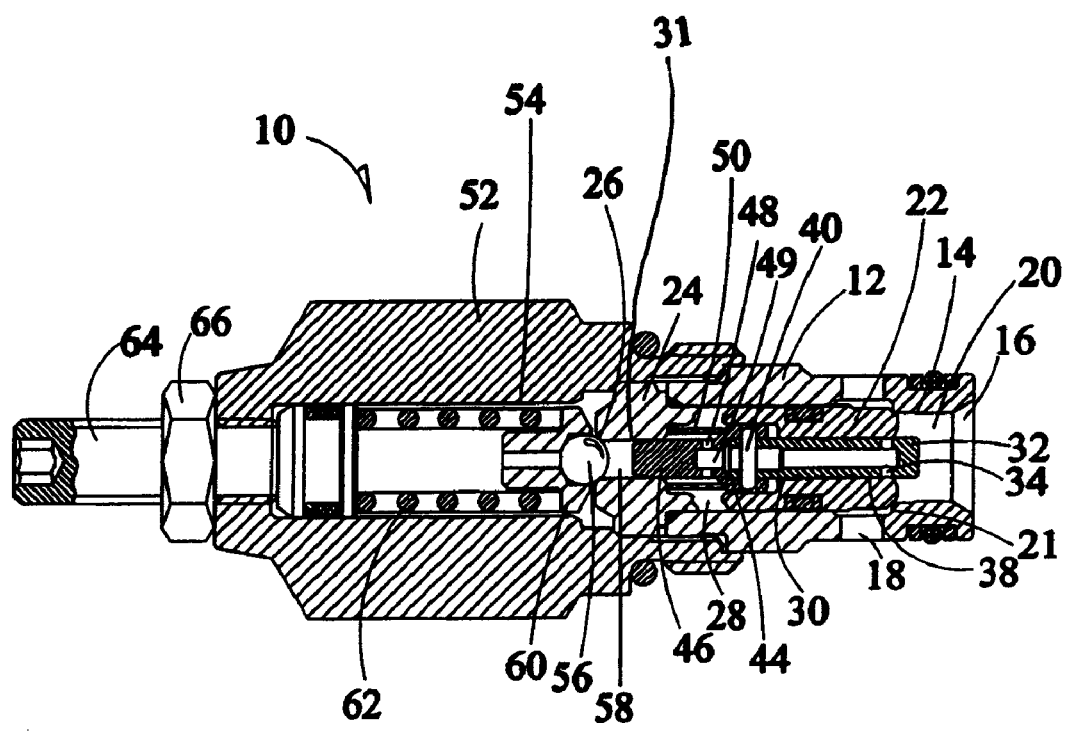
FIG. 2 is a sectional view of a poppet relief valve in a second position.
Figure 3:
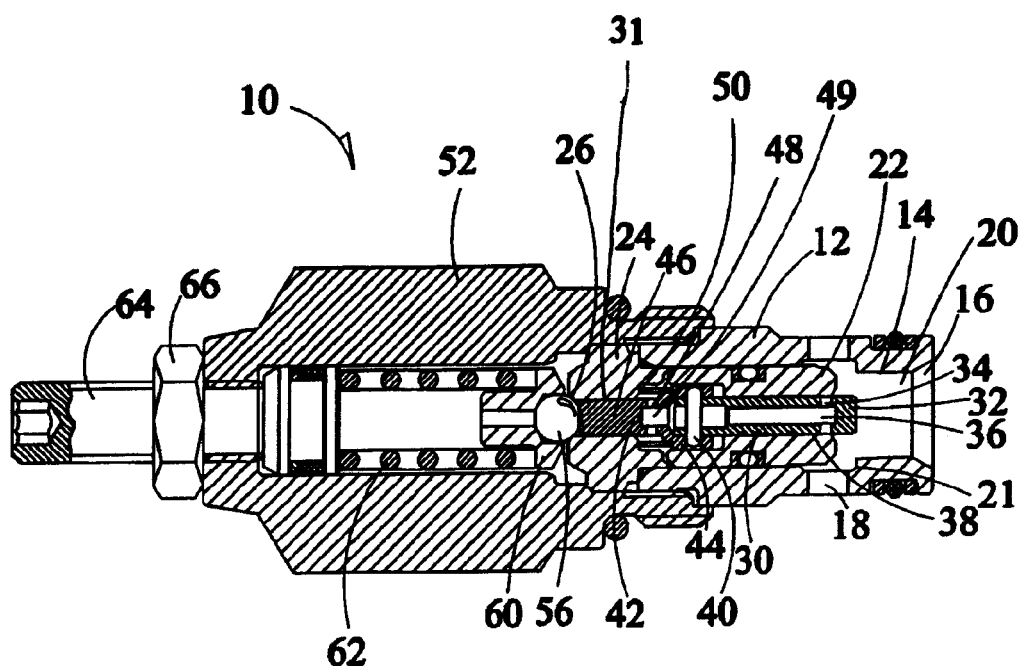
FIG. 3 is a sectional view of a poppet relief valve in a third position.

Disposed within the cavity 14 is poppet 22 and a pilot 24 wherein the first end of the pilot matingly and detachably connects to the poppet 22 within cavity 14 as shown in FIGS. 1-3. The second end of the pilot forms a pilot seat 26 having a milled flat. A second area 28 is disposed between the poppet and pilot 22, 24 within cavity 14 of the poppet housing. The poppet 22 additionally has a cavity 30 disposed therein that extends the distance of the poppet 22. Similarly the pilot 24 has a cavity 31 disposed therein that extends the distance of the pilot 24.

A poppet spool 32 is disposed within the cavity 30 of poppet 22. The poppet spool 32 extends from within the first area 20 through the cavity 30 of spool 22 to a larger diametered portion of the cavity 30 in the second area 28. The spool 32 has cross-drilled holes or a radial passageway 34 disposed therein that intersects axial passageway 36 disposed within spool 32 and surrounded by sidewall 38. Thus, both the radial and axial passageways 34 are internal passageways disposed within the spool 32. The axial passageway 36 extends through the spool 32 to a connection pin 40 that connects the spool 32 and axial passageway 36 to pilot spool 42.

Pilot spool 42 is disposed within the cavity 31 of the pilot 24 and comprises a head portion 44 that is of greater diameter than a stem portion 46 that extends away from the head portion 44. Additionally disposed within the stem 46 of the pilot spool 42 is a radial passageway 48 that is in fluid flow communication with axial passageway 36 of the poppet spool 32 via axial passageway 49. Surrounding the stem 46 of the pilot spool 42 and engaging the head 44 of pilot spool 42 at a first end and engaging the pilot 24 at a second end is a biasing spring 50. Biasing spring 50 biases the pilot 24 away from the pilot spool 42 wherein the spring force of biasing spring 50 must be overcome for the poppet and pilot 22 and 24 to engage.

A hex plug 52 slidably receives the poppet housing 12 within hex plug cavity 54. Disposed within the cavity 54 of hex plug 52 and engaging seat 26 in a first position as shown in FIG. 1 is a pilot ball 56 wherein the area between the pilot ball 56 and the pilot spool 42 is considered a third area 58. Pilot ball 56 is biased against the seat 26 of the pilot 24 by a ball retainer 60 disposed within cavity 54 of hex plug 52. Biasing the ball retainer 60 and thus pilot ball 56 against seat 26 is a pilot spring 62 that is also disposed within cavity 54 of hex plug 52. The pilot spring 62 may be tensioned by a tensioning device 64 that in combination with the nut element 66 is adjustable to provide proper tensioning.

In operation as shown in FIG. 1 when pressure at the first area 20 is below a threshold pressure of the relief valve 10 the pressure acting on both ends of the poppet 22 are equal. This pressure is communicated to both sides of the poppet 22 within the relief valve 10. Specifically, because the second area 28 is larger than the first area 20 there is a net force acting on the poppet 22 to push the poppet 22 against seat 21 of poppet housing 12. When in the first position as shown in FIG. 1 a low leaking interface is created.

As inlet pressure increases at the first area 20 this pressure is communicated through the poppet spool 32 and pilot spool 42 to the second area 28 via internal radial passageways 34, 48 and internal axial passageway 36, 49. The pressure in the second area 28 thus acts upon the pilot ball 56. As the pressure acting on the third area 58 increases to match the force supplied by the pilot spring 62 the pilot ball 56 begins to move off the seat 26 of pilot 24. As the pilot ball 56 moves off the pilot seat 26 the pressure in the second and third areas 28, 58 is routed to the fluid outlet 18 tank port via the milled flat on the pilot seat 26 and the seat 21 of poppet housing 12. The passageways located in the poppet spool 32 restrict the total amount of oil flow into the second and third areas 28, 58 to less than their individual capacities. As the pilot ball 56 moves axially off the pilot seat 26 the pressure in the second area 28 decreases. This pressure imbalance acting on the pilot mechanism 24 moves the entire pilot assembly axially toward the pilot ball 56 against the force generated by the pilot spring 62.

As the passageways in the poppet spool 32 begin to close as a result of the axial movement the flow into the second area 28 decreases further. This decrease in flow increases the pressure imbalance acting on the pilot mechanism 24. This in turn closes the passageways completely in the poppet spool 32 within the poppet 22 as shown in FIG. 2.

With the passageways closed the inlet pressure at the first area 20 acts upon the poppet 22 and seat 21 interface. With the pressure acting on the poppet/seat interface and the pressure acting upon the poppet in the second area 28 at or near tank pressure there is a higher pressure imbalance acting on the poppet. This higher pressure imbalance moves the poppet 22 axially toward the pilot ball 56. The poppet spool 32/pilot spool 42 assembly continues to move axially to contact the pilot ball 56 and completely move it off the pilot seat 26 as shown in FIG. 3.

The axial movement of the poppet 22 is regulated by the axial position of the radial passageway 34 within poppet spool 32. As the pilot ball 56 moves axially either direction the pilot assembly follows. As the pilot assembly moves axially the poppet 22 follows to open and close as is required by the amount of flow through the valve varies. The pilot assembly works in conjunction with the poppet 22 to maintain a constant differential pressure acting on the poppet 22 regardless of the flow through the valve.

As the pressure at the first area 20 decreases to below the threshold pressure the pilot spring 62 pushes the ball retainer 60 and pilot ball 56 back onto the pilot seat 26. The pilot mechanism assembly is pushed axially along with the pilot ball 56. As the pilot ball 56 seats or closes the flow path through the pilot seat 26 the pressure in the second and third areas 28, 58 increase from tank pressure. This pilot assembly movement opens the radial passageway 34 and allows the pressure in the second area 28 to equalize with the pressure at the first area 20. As the pressure in the first and second areas 20, 28 approach equilibrium the poppet 22 acquires a net force acting to close the valve.

Thus, by having the passageways 34, 38, 49 and 50 disposed within the poppet spool 32 and the pilot spool 42 fluid is able to be metered through the poppet and pilot spools 32, 42 to provide a minimal rise in pressure during operation. In a preferred embodiment the internal leakage rate of the valve is reduced to ten drops per minute. Thus, more control and stability is provided throughout the relief valve 10. Also, the passageways are easily machined within the spools minimizing complex geometries and reducing manufacturing costs. Consequently, at the very least, all of the stated objectives have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. A relief valve for a hydraulic device comprising:
   a poppet matingly and detachably connected to a pilot wherein the poppet moves relative to the pilot;
   a poppet spool disposed within the poppet and having internal passageways including a radial passageway that intersects an axial passageway disposed therein;
   a pilot spool disposed within the pilot and having internal passageways including a radial passageway that intersects an axial passageway disposed therein;
   wherein the internal passageways of the pilot spool are fluidly connected to the internal passageways of the poppet spool to provide fluid communication from a first area to a second area disposed between the poppet and the pilot and restrict fluid flow into the second area as the internal passageways of the poppet spool begin to close as the pilot spool and poppet spool move axially toward the pilot in response to an increased pressure in the first area; and
   wherein an axial movement of the poppet is regulated by an axial position of the radial passageway within the poppet spool to maintain a constant differential pressure acting on the poppet regardless of the fluid flow through the valve.

2. The valve of claim 1 further comprising a biasing spring engaging the pilot and the pilot spool to bias the pilot spool away from the pilot.

3. The valve of claim 1 further comprising:
   a poppet housing having a centrally located cavity containing the poppet and poppet spool and partially containing the pilot;
   said poppet housing having an inlet and an outlet fluidly connected to a tank; and
   wherein the inlet is adjacent the first area.

4. The valve of claim 3 wherein the second area is within the poppet housing disposed between the poppet and pilot.

5. The valve of claim 3 wherein the poppet removably engages a seat of the poppet housing.

6. The valve of claim 5 wherein the poppet spool moves within the poppet to prevent fluid communication between the first area and the second area.

7. The valve of claim 6 wherein the poppet moves axially within the poppet housing and disengages the seat of the poppet housing to provide fluid communication from the inlet to the outlet.

8. The valve of claim 7 wherein the pilot spool removably engages a pilot ball.

9. The valve of claim 8 wherein the pilot ball disengages a seat of the pilot to route pressure in the second area to the tank.

10. The valve of claim 9 further comprising a hex plug having a cavity that receives the poppet housing and contains the pilot ball.

11. The valve of claim 9 wherein a third area is provided between the pilot ball and the pilot spool.

12. The valve of claim 10 wherein the cavity of the hex plug has a biasing spring that actuates a pilot ball retainer that biases the pilot ball against the seat of the pilot.

13. The valve of claim 1 wherein the radial passageway of the pilot spool is in fluid communication with the axial passageway of the poppet spool via the axial passageway of the pilot spool.

* * * * *